United States Patent [19]

Brüggemann et al.

[11] 4,088,347
[45] May 9, 1978

[54] SEALING ARRANGEMENT

[75] Inventors: Hans Brüggemann, Stuttgart; Otto Heilemann, Wernau, both of Germany

[73] Assignee: Daimler-Benz Aktiengesellschaft, Germany

[21] Appl. No.: 635,106

[22] Filed: Nov. 25, 1975

[30] Foreign Application Priority Data

Nov. 27, 1974 Germany .............................. 2455986

[51] Int. Cl.² .............................................. F16L 35/00
[52] U.S. Cl. ....................................... 285/24; 277/236; 285/93; 285/189; 285/328; 285/363; 285/DIG. 11; 285/DIG. 15
[58] Field of Search ............... 285/DIG. 11, DIG. 18, 285/DIG. 15, 363, 349, 93, 328, 24, 27, 189; 277/235 B, 236, 166, 11, 180, 10, 9.5, 9

[56] References Cited

U.S. PATENT DOCUMENTS

| 1,587,626 | 6/1926 | Bailey | 277/236 |
| 1,851,948 | 3/1932 | Summers | 285/363 X |
| 2,055,471 | 9/1936 | Balfe | 277/235 B |
| 2,092,393 | 9/1937 | Hewitt | 285/DIG. 11 |
| 3,503,634 | 3/1970 | Cadiou | 277/11 X |
| 3,655,210 | 4/1972 | Farnam | 277/235 B |
| 3,794,333 | 2/1974 | Czernik | 277/235 B |

Primary Examiner—Dave W. Arola
Attorney, Agent, or Firm—Craig & Antonelli

[57] ABSTRACT

A sealing arrangement between a pipe flange and a screw-on surface for the pipe flange, in which an abutment surface is provided at either the screw-on surface or the pipe flange which extends perpendicularly to the abutment surface of the flat seal in the direction toward the oppositely disposed abutment surface of the pipe flange or screw-on surface, and which is at least approximately tangent to the outer contour of the flat seal at a circumferential place outside of the point of intersection of a line of symmetry with the outer contour of the flat seal; rejection lugs are provided at the outer contour of the flat seal at those places which are disposed opposite the contact places between the abutment surface and the outer contour of the flat seal in relation to the line or lines of symmetry.

27 Claims, 3 Drawing Figures

SEALING ARRANGEMENT

The present invention relates to a sealing arrangement between a pipe flange, especially a steel pipe flange and a screw-on surface for the pipe flange arranged at a structural part consisting perferably of aluminum or the like, with an arrangement of flange bolts symmetrical with respect to at least one line of symmetry as well as with a flat seal of non-equal sides mounted between the pipe flange and the screw-on surface, which surrounds the flange bolts, especially with a fluid opening at the sealing place which is also symmetrically constructed with respect to the aforementioned line or lines of symmetry and is arranged relative to the flange bolts.

With scalene flat seals, i.e., with flat seals of unequal sides, in which it is not immaterial in which position they are installed into the sealing gap, it is important to undertake measures that they are not inadvertently installed in the wrong position in the sealing arrangement. It might be considered, for example, to depart from a symmetrical arrangement of the flange bolts so that only a predetermined installed position of the flat seal is possible. This, however, entails the disadvantage of a non-uniform tightening of the flat seal, of an unequal warping of the structural part and of an unequal compressing of the flat seal. This, under certain circumstances, may jeopardize altogether the reliable functioning of the sealing arrangement. As to the rest, it is extremely burdensome and annoying in assembly line installations if a part such as a flat seal is adapted to be installed only in a single relative position which can be recognized only with dificulty and has to be searched for in a complicated, cumbersome manner. In some cases, a certain asymmetry of the fluid openings offers a readily recognizable reference point for an erroneous assembly or incorrect installation. This approach, however, has to be discarded if, for other reasons, a symmetrical, for example, a round fluid opening is provided. As to the rest, a mere obviousness of an erroneous assembly or incorrect installation is not able as such to prevent an error in case of a high degree of negligence.

The present invention is concerned with the task to so improve the aforementioned sealing arrangement with a symmetrical bolt arrangement that both a number of easily recognizable assembly possibilities of the flat seal remain preserved, whereas an incorrect assembly and installation of the flat seal with unequal sides is precluded.

The underlying problems are solved according to the present invention in that an abutment surface is provided at the screw-on surface or at the pipe flange, which extends perpendicularly to the abutment surface of the flat seal in the direction toward the opposite abutment surface and which is at least approximately tangent to the outer contour of the flat seal at a circumferential place located outside of the point of intersection of a line of symmetry with the outer contour of the flat seal, and in that rejection lugs or tabs or provided at the outer contour of the flat seal at those places which are disposed opposite the contact place between the abutment surface and the outer contour of the flat seal in relation to the aforementioned line or lines of symmetry.

With this construction of the sealing arrangement, any desired relative position is possible with a correct lateral position of the flat seal whereas with an incorrect lateral position of the flat seal, not a single relative position is possible because in each case a rejection lug collides with the abutment surface. The sealing arrangement according to the present invention, as to the rest, is favorable from a manufacturing point of view because the abutment surface is located outside of the abutment surface of the flat seal, i.e., outside of a smoothly machined surface and with a suitable tool guidance will result all by itself in a favorable manner as material left-over or residue at the machining boundary. In this construction, the abutment surface does not have to be subsequently created artificially.

With smaller flange connections, frequently and hence also in the engine design in connection with the fastening of exhaust gas lines at the cylinder head, two bolt flanges are used together with a flat seal corresponding essentially to a diamond with rounded-off corners as regards the outer contour thereof. With this special type of the flange connection, the sealing arrangement according to the present invention is so constructed that the abutment surface extends parallel to a rectilinear side of the flat seal and that the rejection lugs or tabs are provided at the two sides adjacent this side.

The scalene configuration of the flat seal, i.e., the unequal sides of the flat seal may result, for example, from the construction thereof as corrugation or bead seal of sheet-metal with a one-sided arrangement of the stiffening corrugations or beads. With unequal pairing of the material hardnesses meeting in the sealing gap, for example, with steel at the pipe flange and with aluminum at the cylinder head, the seal is thereby to be so installed that the sheet-metal corrugations or beads press against the steel pipe flange and the flat seal side presses against the aluminum surface. Otherwise, the sealing corrugations or ridges would press into the aluminum and leave behind a permanent groove.

For purposes of preventing distortions and warping of the sealing arrangement as a result of tightening forces stemming from the threaded connections, provision may be made that sheet-metal corrugations or beads (support beads) are arranged also on the side of the bolt holes of the flat seal opposite the fluid opening. These support corrugations or beads appropriately surround the bolt holes in a semi-circular-shaped manner. In order to achieve a certain pre-tightening of the sealing corrugations or beads, provision may be made that the support corrugations or beads are lower, preferably by about 1/5 to ½ lower than the sealing corrugation or bead surrounding the fluid opening of the flat seal.

Accordingly, it is an object of the present invention to provide a sealing arrangement which avoids by simple means the aforementioned shortcomings and drawbacks encountered in the prior art.

Another object of the present invention resides in a sealing arrangement of the type described above which precludes an incorrect installation of the flat seal, yet permits several installation possibilities which can be readily recognized.

A further object of the present invention resides in a sealing arrangement which can be readily adopted for assembly line production, obviates the need for skill on the part of the assembler to determine the correct position of the seal and at the same time eliminates the danger of non-uniform tightening of the flat seal and non-uniform distortion of the parts involved.

Still a further object of the present invention resides in a sealing arrangement which eliminates incorrect assemblies, yet utilizes relatively simple, inexpensive parts.

Still a further object of the present invention resides in a sealing arrangement that can be used with parts that are machined in a simple manner to provide the respective abutment surfaces.

These and other objects, features and advantages of the present invention will become more apparent from the following description when taken in connection with the accompanying drawing which shows, for purposes of illustration only, one embodiment in accordance with the present invention, and wherein.

Figure 1:
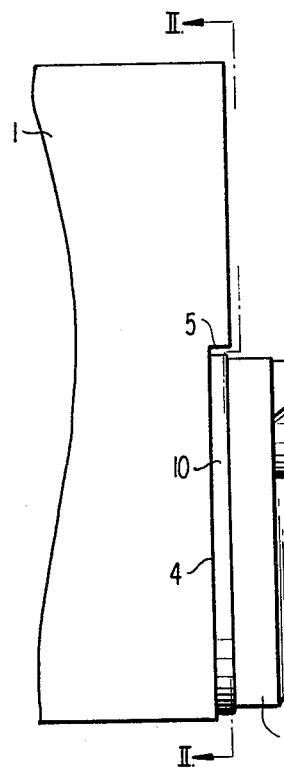
FIG. 1 is a side elevational view of a sealing arrangement according to the present invention.
Figure 2:
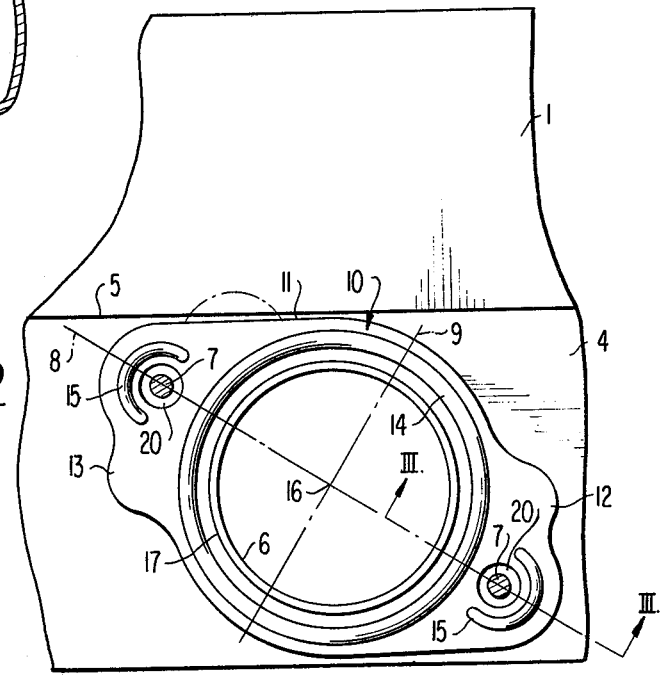
FIG. 2 is an end elevational view on the flat seal in accordance with the present invention in the installed position at the structural part, taken along line II—II of FIG. 1.

Referring now to the drawing wherein like reference numerals are used throughout the various views to designate like parts, the cylinder head 1 partly shown and schematically indicated in FIGS. 1 and 2 of an internal combustion engine (not shown) consists of a relatively soft aluminum casting alloy. Several exhaust lines 2 of steel each provided with an oval flange 3 are connected at the cylinder head 1, one behind the other—corresponding to the working spaces of the engine. The cylinder head 1 includes a machined sealing surface 4 for each oval flange 3 which can be appropriately machined with all sealing surfaces aligned in the same plane and machined in the course of a single machining operation. A step with the abutment surface 5 then results from the machining operation. This step with the abutment surface 5 is thereby located outside of the contact surface of the flat seal to be described more fully hereinafter and generally designated by reference numeral 10, with the sealing surface 4, and extends perpendicularly to the sealing surface 4 in the direction toward the counter-flange 3. Additionally, one fluid opening 6 and two stay-bolts or studs 7 for tightening the sealing arrangement are provided at the cylinder head 1. The fluid opening 6 and the arrangement of the stay-bolts 7 are arranged and constructed axially symmetrically with respect to two lines of symmertry 8 and 9 (FIG. 2).

The flat seal 10 which is dissimilar on opposite sides thereof by reason of a sealing corrugation or bead 14 and of support beads or corrugations 15 and which surrounds essentially diamond-shaped the stay-bolts or studs 7, is so arranged in the sealing arrangement of the present invention by reason of the inclined position of the line of symmetry 8 extending through the stay-bolts 7 with respect to the abutment surface 5 that the abutment surface 5 is approximately tangent to a side edge 11 of the flat seal 10. The place of tangency is located outside of the point of intersection of a line of symmetry with the outer contour of the flat seal 10. One deflection tab or rejection lug 12 and 13 each is provided at the outer contour of the flat seal 10 symmetrically to the side edge 11 tangent to the abutment surface 5 in relation to the lines of symmetry 8 and 9. Owing to these rejection lugs exclusively the illustrated installed position of the flat seal or an installed position thereof pivoted through 180° about the center point 16 is possible, in which the corrugations or beads 14 and 15 come to lie in the direction toward the counter-flange 3; in contradistinction thereto, an installed position rotated through 180° about the line of symmetry 8 or 9 perpenciularly to the plane of the drawing is impossible because in that case—as indicated by the dash and dot line—a rejection lug would abut at the step with the abutment surface 5 and a plane abutment of the flat seal 10 at the abutment surface 4 would be prevented thereby so that an orderly assembly of the sealing arrangement would be impossible.

Figure 3:
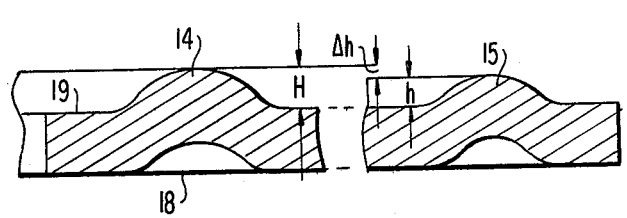
FIG. 3 is a partial cross-sectional view, on an enlarged scale, through the flat seal, taken along line III—III in FIG. 2.

The flat seal is made as annular bead or ridge seal from one single sheet-metal piece with a sealing corrugation or bead 14 on one side surrounding annularly shaped the fluid opening 17. A relatively flat bottom side 18 (FIG. 3) and a relatively uneven top side 19 will result therefrom. The sealing effect comes into existence on the ring-shaped narrow sealing strip surrounding the fluid opening by the intentional concentration of the sealing surface pressure and the deformations necessary therefor should be limited to the flat seal, but should not extend also to the structural parts 1 or 3. For that reason, care is taken that the sealing corrugation or bead presses only against the hard steel-flange sealing surface where it cannot leave any impressions in contrast to a compressing abutment on aluminum. For purposes of absorbing flange deformations or structural part deformations by reason of bolting forces, support corrugations or beads 15 with the height $h$ are provided semi-circularly shaped about the bolt holes 20 on the side of the bolt holes 20 opposite the fluid opening 17. As shown in FIG. 3, the support corrugation or bead 15 is lower by an amount $\Delta h$ than the height H of the sealing corrugation or bead 14, preferably smaller by a about 1/5 to ⅓ than the height H. This is done for the reason to be able to slightly prestress the sealing corrugation or bead 14 prior to abutment of the support corrugation or bead 15 at the flange 3.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A sealing arrangement between a pipe flange and a screw-on surface means for the pipe flange which includes flange bolt means and a flat seal means of dissimilar sides which is installed between abutment surfaces of the pipe flange and the screw-on surface means, said flt seal means surrounding the flange bolt means, characterized in that an abutment surface means is provided at one of the two parts consisting of screw-on surface means and pipe flange which extends substantially perpendicularly to the abutment surface of the one part in the direction toward the abutment surface of the other of the two parts and which is at least approximately tangent to the outer contour of the flat seal means at a circumferential place located outside of the point of intersection of at least one line of symmetry of said flat seal means with the outer contour of the flat seal means, and in that rejection lug means for determining positioning of said flat seal means are provided at the outer contour of the flat seal means at those places which are disposed substantially opposite the tangent place between abutment surface means and outer contour of the flat seal means relative to said at least one line of symmetry.

2. A sealing arrangement according to claim 1, characterized in that the pipe flange is of steel and the screw-on surface means is arranged at a structural part of relatively softer material.

3. A sealing arrangement according to claim 2, characterized in that the softer material is aluminum.

4. A sealing arrangement accordng to claim 1, characterized in that the flat seal means is provided with a fluid opening at the sealing place which is also constructed substantially symmetrically to the line of symmetry and is symmetrically arranged relative to the flange bolt means.

5. A sealing arrangement according to claim 4, with a two-bolt pipe flange means and with a flat seal means corresponding essentially to a diamond with rounded-off corners as regards its outer contour, characterized in that the abutment surface means extends parallel to one rectilinear side of the flat seal means and in that the rejection lug means are provided at the two sides of the flat seal means adjacent said rectilinear side.

6. A sealing arrangement according to claim 5, characterized in that sealing bead means surrounding the fluid opening are provided only on the side of the flat seal means facing the pipe flange.

7. A sealing arrangement according to claim 6, characterized in that support bead means are also provided on the side of bolt openings of the flat seal means opposite the fluid opening.

8. A sealing arrangement according to claim 7, characterized in that the support bead means partially surround the bolt openings and are semi-circularly shaped.

9. A sealing arrangement according to claim 8, characterized in that the support bead means are lower than the sealing bead means surrounding the fluid opening of the flat seal means.

10. A sealing arrangement according to claim 9, characterized in that the support bead means are lower by about 1/5 to ½ than the sealing bead means.

11. A sealing arrangement according to claim 1, with a two-bolt pipe flange means and with a flat seal means corresponding essentially to a diamond with rounded-off corners as regards its outer contour, characterized in that the abutment surface means extends parallel to one rectilinear side of the flat seal means and in that the rejection lug means are provided at the two sides of the flat seal means adjacent said rectilinear side.

12. A sealing arrangement according to claim 2, characterized in that the flat seal means is provided with a fluid opening at the sealing place which is also constructed substantially symmetrically to the line of symmetry and is symmetrically arranged relative to the flange bolt means.

13. A sealing arrangement according to claim 1, characterized in that sealing bead means are provided only on the side of the flat seal means facing the pipe flange.

14. A sealing arrangement according to claim 13, characterized in that support bead means are also provided on the same side of the flat seal means.

15. A sealing arrangement according to claim 14, characterized in that the support bead means are lower than the sealing bead means surrounding the fluid opening of the flat seal means.

16. A sealing arrangement according to claim 15, characterized in that the support bead means are lower by about 1/5 to ½ than the sealing bead means.

17. In a sealing arrangement between first and second members, each of said first and second members having respective sealing surfaces, which includes flat sealing means installed between said respective sealing surfaces for accommodating sealing between said first and second members, and means for assembling said first and second members with said flat sealing means therebetween, the improvement comprising abutment means provided at one of said first and second members for establishing a mounting position of said flat sealing means between said first and second members, and lug means provided on said flat sealing means for determining said mounting position of said flat sealing means in accordance with said abutment means, wherein said abutment means accommodates at least approximately tangentially an outer contour edge portion of said flat sealing means, and wherein said lug means is disposed at at least one second outer contour edge portion of said flat sealing position and prevents said second outer contour edge portion from being arranged at said abutment means.

18. A sealing arrangement according to claim 17, wherein said outer contour edge portion of said flat sealing means which is accommodated at said abutment means and said lug means on said flat sealing means are arranged approximately symmetrically with respect to one another relative to at least one line of symmetry of said flat sealing means.

19. A sealing arrangement according to claim 18, wherein said outer contour edge portion is rectilinear, and wherein said abutment means includes a step portion having a surface parallel to said rectilinear edge portion of said flat sealing means.

20. A sealing arrangement according to claim 18, wherein said flat sealing means has a fluid flow opening and a pair of bolt openings disposed along said line of symmetry.

21. A sealing arrangement according to claim 20, wherein sealing bead means surrounding said fluid flow opening are provided at one surface of said flat sealing means.

22. A sealing arrangement according to claim 21, wherein support bead means are provided at said surface at least partially surrounding each of said pair of bolt openings.

23. A sealing arrangement according to claim 22, wherein said support bead means have a height extending from said surface which is 1/5 to ½ lower than the height of said sealing bead means.

24. A sealing arrangement according to claim 17, wherein said abutment means includes a step portion having a surface extending approximately tangentially to said outer edge portion of said flat sealing means.

25. A sealing arrangement according to claim 24, wherein said outer edge portion at said step portion and said lug means are arranged approximately symmetrically relative to at least one line of symmetry of said flat sealing means.

26. In a sealing arrangement between first and second members, each of said first and second members having respective sealing surfaces, which includes flat sealing means installed between said respective sealing surfaces for accommodating sealing between said first and second members, and means for assembling said first and second members with said flat sealing means therebetween, the improvement comprising abutment means provided at one of said first and second members for establishing a mounting position of said flat sealing means between said first and second members, and lug means provided on said flat sealing means for determining said mounting position of said flat sealing means in accordance with said abutment means, wherein said abutment means includes a step portion having a surface exending approximately tangentially to an outer edge portion of said flat sealing means, and wherein said lug means are disposed at at least one further outer edge portion of said flat sealing means.

27. A sealing arrangement according to claim 26, wherein said outer edge portion at said step portion and said lug means are arranged approximately symmetrically relative to at least one line of symmetry of said flat sealing means.

* * * * *